Nov. 11, 1930.                    E. P. FERNGREN                    1,781,452
                      METHOD AND APPARATUS FOR DRAWING SHEET GLASS
                Filed March 20, 1922                 2 Sheets-Sheet 1
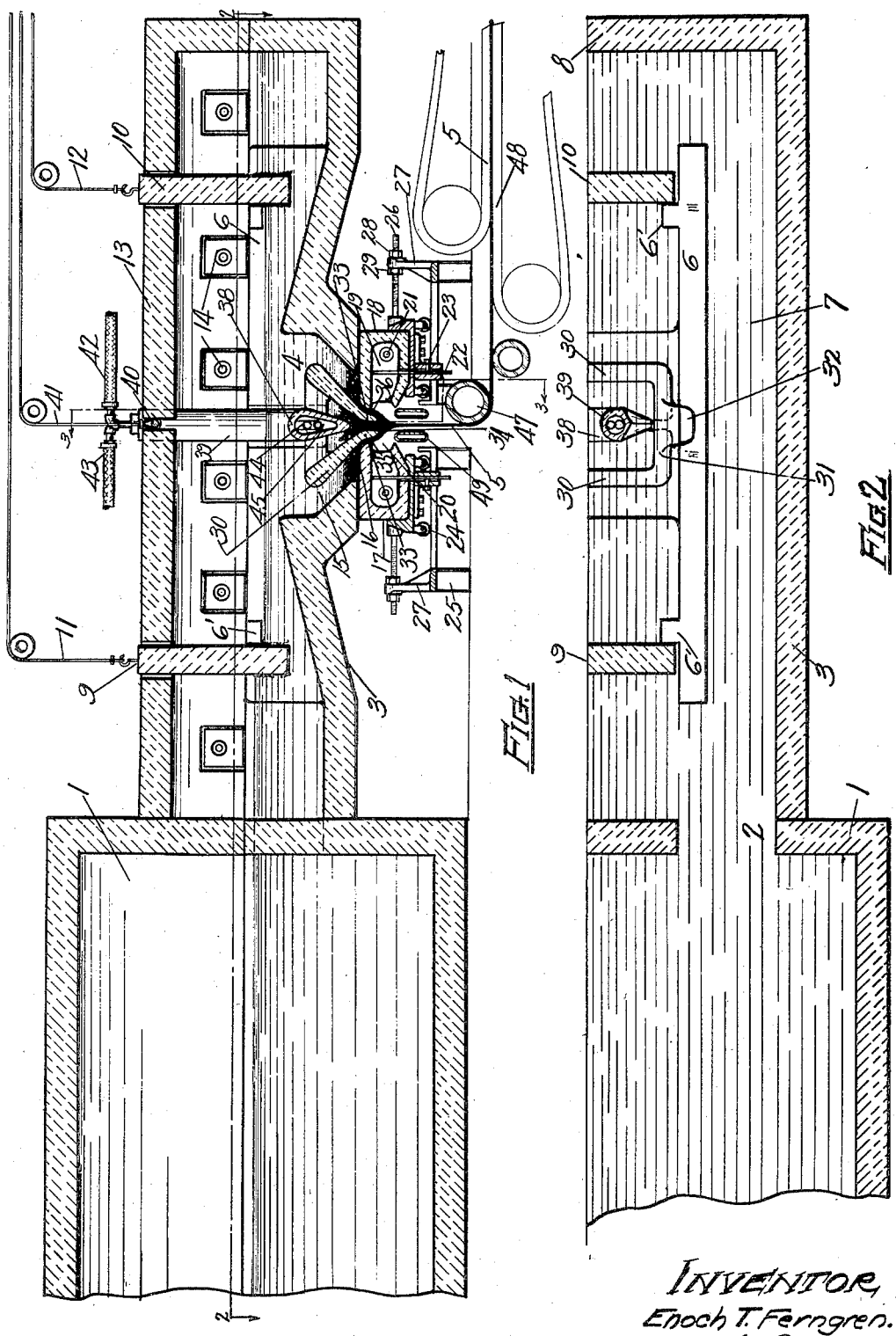
INVENTOR,
Enoch T. Ferngren.
BY C.A.Rowley
ATTORNEY Nov. 11, 1930.   E. P. FERNGREN   1,781,452
METHOD AND APPARATUS FOR DRAWING SHEET GLASS
Filed March 20, 1922    2 Sheets-Sheet 2

INVENTOR
Enoch T. Ferngren
BY C.A. Rowley
ATTORNEY

Patented Nov. 11, 1930

1,781,452

UNITED STATES PATENT OFFICE

ENOCH T. FERNGREN, OF TOLEDO, OHIO, ASSIGNOR TO LIBBEY-OWENS-FORD GLASS COMPANY, OF TOLEDO, OHIO, A CORPORATION OF OHIO

METHOD AND APPARATUS FOR DRAWING SHEET GLASS

Application filed March 20, 1922. Serial No. 545,207.

This invention relates to a new and improved method and apparatus for drawing sheet glass, and more especially to a system for drawing the sheet downwardly from a pool or supply of molten glass.

In general, the new method consists in creating different states of fluidity in the glass from which the sheet is drawn, so that the main or central portion of the sheet will be composed of glass having a tenacious semi-plastic consistency, possessing a slight degree of mobility under the action of gravity, and the exterior or surface portions of the sheet are drawn from hotter glass having greater fluidity and less resistance to the drawing action.

By means of a cooling element within the mass of molten glass above the discharge point a source of cooler stiffer glass is created, and at the same time this cooling means acts as a line of resistance to the drawing force, and the sheet will to a certain degree be hung or supported from this cooling device. The glass affected by the cooling means which is to form the central or major portion of the sheet, is separated from the more fluid glass which is to form the surface portions of the sheet by refractory partition members which are arranged to separate the cooler glass from the hotter more fluid glass, and at the same time guide the three streams of glass to a common line of discharge, where they coalesce to form the single sheet of glass which is drawn vertically downward until partially set in sheet form. In this way the tension or pulling strain is confined largely to the interior portion of the sheet, leaving the surface portions to flow freely from contact with the container, thus eliminating the lines which would ordinarily be caused by the cooler surface glass adhering to the edges of the outlet orifice in the container.

Also, by having the cooler portion of the sheet inside, the surface portions when cooling will contract and be stretched on the cooler core, thus drawing out any waves or wrinkles in the surfaces.

A further object of the invention is to provide a new and improved method of securing uniform temperature conditions at both ends of the receptacle from which the sheet is drawn.

The above, and many other advantages and details of this new system of producing sheet glass will be more apparent from the following detailed description of certain forms of apparatus adapted to carry out the principles of this invention.

In the accompanying drawings:

Fig. 1 is a vertical longitudinal section through one approved form of the apparatus.

Fig. 2 is a partial horizontal section taken substantially on the line 2—2 of Fig. 1.

Figure 3:
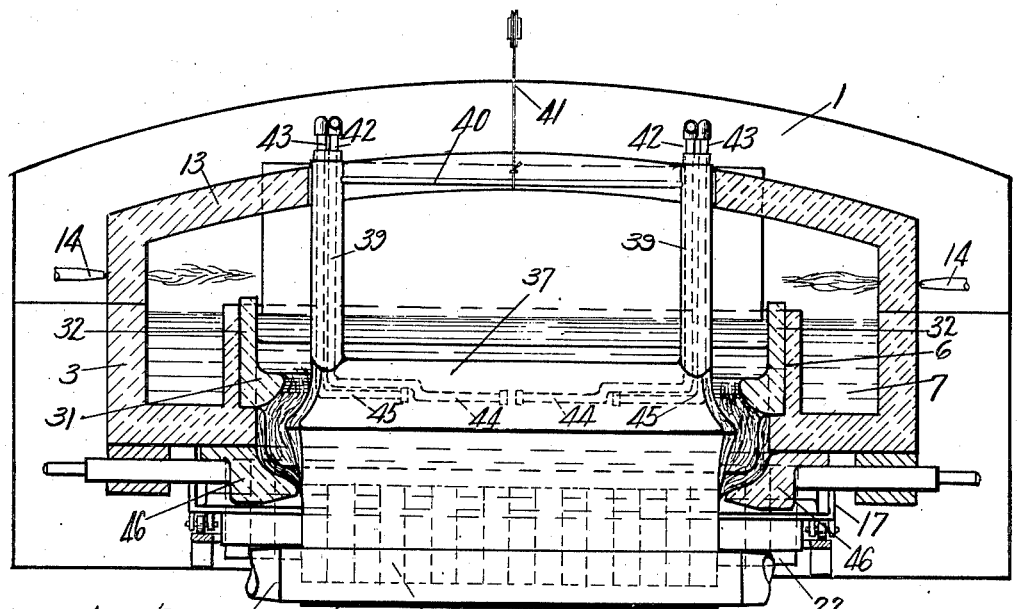
Fig. 3 is a transverse vertical section taken substantially on the line 3—3 of Fig. 1.

At 1 is indicated a source of molten glass, such as the discharge end of a continuous tank furnace. The end wall of the furnace is substantially closed except for two open conduits, as at 2, one at either side of the tank, through which the glass flows from the furnace into the receptacle 3, which contains the central pool of molten glass 4, from which the glass sheet 5 is drawn. A pair of longitudinal partitions 6, within receptacle 3, define a pair of side run-ways or conduits 7 for providing a continuous flow of glass to the closed end 8 of the receptacle. Projecting down into the glass flowing from either end of the receptacle toward the pool 4, are a pair of gates or shear-cakes 9 and 10. Lugs 6' on partitions 6 prevent the flowing glass from swinging the gates inwardly. The glass ordinarily must flow beneath these gates, which act as floats or skimmers. When the gates are completely lowered by means of the supporting cables 11 and 12, they serve to cut-off the flow of glass to the central pool 4. The receptacle 3 is practically enclosed both at the sides and ends by the housing 13, and the glass within all parts of the receptacle is maintained at a uniform and proper temperature by suitable burners, some of which are indicated at 14. Since the heat from the furnace is shut off by the end wall at 1, and the temperature within the chamber 13 is maintained uniform by burners 14, the flow of glass from either end into the central pool 4 will be equal and of a uniform temperature.

The pool of glass 4 is contained in a central well or depression 15 in the receptacle 3, and this well 15 has a transverse opening 16 in its bottom, which opening is partially closed by a pair of similar adjustable bottom members 17 and 18 which are movable toward and from one another to determine the width of the slot or orifice therebetween, through which the molten glass flows and is drawn to form the sheet of glass. Each bottom member 17 and 18, comprises a hollow body member, containing a heating chamber 19, open at its inner side 20, to direct the heat from burners 21 against the side streams of glass flowing into the surfaces of the sheet 5. A series of vanes or dampers 22, which may be refractory plates of silicon carbide or similar material, project through the lower portion of the member 17 or 18, and are held in any desired vertical adjustment by set-screws 23. In this way the amount of heat directed against different transverse portions of the glass sheet may be varied as circumstances require. Each bottom member is supported on suitable rollers or bearings 24 movable on supported a loop member or refractory material moved in or out and held in adjusted position by screw 26 adjusted through extension 27 of frame 25, by nuts 28 and 29.

Within the pool of molten glass 4 is supported a loop member of refractory material consisting of inwardly and downwardly inclined transverse partition members 30, joined at their ends by cross-pieces 31. The loops are supported by vertical tongues 32, on cross-pieces 31, which engage in vertical slots in the longitudinal partitions 6. The partitions 30 taper downwardly and their thinner lower edges 33 come rather closely together, leaving a narrow slot 34 therebetween. The two edges 33 project into the bottom orifice in the container defined by the bottom members 17 and 18, thus forming two other transverse slots 35 and 36, one at either side of and parallel to the central slot 34.

Within the molten glass, above and between the partitions 30, is suspended a cooling member, comprising a hollow downwardly tapered transverse bar 38, and an upwardly extending hollow leg member 39 at each end. The two leg members are joined by a cross-rod 40 from which the cooler is adjustably suspended by means of cable 41. Passing through each leg-member 39 is a pair of pipes 42 and 43 terminating in perforated extensions 44 and 45, respectively, within the transverse bar 38. Cooling air, of either the same or different temperatures or pressures, may be fed into the bar 38 through both or either of the pipes. In this way the temperatures at different transverse points in the length of bar 38 may be regulated as desired. The air from the perforated pipes 44 and 45, after impinging against and cooling the walls of bar 38, escapes through the hollow leg members 39.

Beneath each end of the transverse slots is placed an edge forming guide 46, comprising a block of, preferably, refractory material having a concaved inner and upper face for catching the stream of glass flowing around the end of the cooler and directing it into the edge of the sheet.

The sheet of glass 5 is drawn away from the molten glass passing down through the slots by any approved form of drawing mechanism. As shown in the drawings, before the sheet is completely set, it is bent around a horizontal roller 47 and drawn off in the horizontal plane by a suitable drawing mechanism 48. It might be found more desirable to draw the sheet continuously downward, and cut it into sections of the desired length after it has sufficiently cooled and set.

Immediately below the slots from which the molten glass is drawn, the sheet passes between a pair of coolers 49 which assist in the rapid setting of the sheet. These coolers are preferably of the hollow metallic type through which a constant flow of cooling water is maintained.

In operation, the molten glass which is drawn down between the partition members 30 is cooled by bar 38 to a rather tenacious, semi-plastic consistency and the main central portion, or core, of the sheet is drawn from this cooler glass. The cooler 38 acts as a sort of support or anchor from which the sheet is drawn. The molten glass flowing through the two side passages 35 and 36 is not materially affected by the cooler 38, and remains in a hotter more fluid condition. This condition is further maintained by the heat directed against these streams from the heating chambers 19. Thus this hotter glass is drawn freely, and without appreciable tension, into the surface portions of the sheet. The absence of pronounced drawing tension, between this glass and the edges of the bottom members 17 and 18 over which the glass flows, tends to avoid the formation of lines and devitrified glass at these points. Furthermore, since the cooler portion of the glass is drawn into the inside of the sheet, acting as a stiffer core or foundation for the sheet, the contraction of the hotter surface glass onto this core as the surfaces cool, will produce smooth flat surfaces devoid of waves or wrinkles. The flow of heat from chambers 19 against the sheet surfaces at their inception acts to relax the surface tension in the sheet, and also to fire-polish the sheet surfaces and give them a uniformly flat and lustrous finish.

Figure 4:
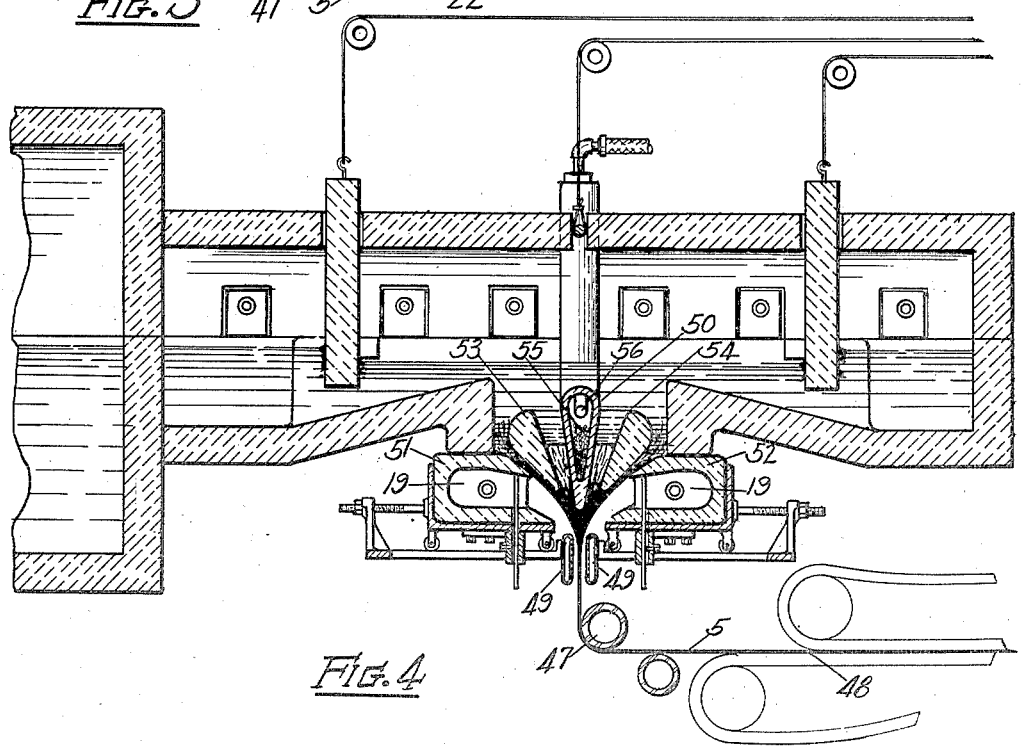
Fig. 4 is a longitudinal vertical section, similar to Fig. 1, through a slightly modified form of the apparatus.

A slightly modified form of the apparatus is disclosed in Fig. 4 of the drawings. In this form, the cooler 50 is made considerably deeper than in the form first described, and its lower edge extends well down through the slot formed between the bottom members 51 and 52, which are somewhat differently proportioned from those shown at 17 and 18 in Fig. 1, to allow for the wider aperture therebetween. The side partitions 53 and 54 also project through the bottom slot but do not extend down as far as the lower edge of cooler 50. The cooler 50 is of somewhat different construction from that shown in Figs. 1 and 2. In the lower portion of the cooler cavity is a quantity of pebbles or other granular material 55 which acts to disperse the cooling air or other fluid fed in through pipe 56 and thus secure a more uniform temperature throughout the cooler.

In this second form of the apparatus, the general principles of operation are the same as in the first form. However, the surface portions of the sheet during the formation period have a greater area of exposure to the heat from chambers 19, thus allowing a longer period for the smoothing and flattening of the sheet surfaces.

Claims:

1. The method of producing sheet glass, consisting in drawing the sheet downwardly from an opening in the bottom of a container, and simultaneously cooling the glass drawn through the central portion of the opening and heating the glass drawn through the side portions of the opening.

2. The method of producing sheet glass, consisting in drawing a cool semi-plastic sheet of glass downward through the central portion of an aperture in the bottom of the molten glass container, and flowing hotter more fluid glass through both sides of the aperture to form the surfaces of the sheet.

3. The method of producing sheet glass, which consists in forming a body of plastic glass of semi-rigid consistency within a body of more fluid glass, and drawing the sheet downwardly from this plastic body, while simultaneously distributing a coating of the more fluid glass thereon, and then continuously directing a flow of heat against the coating of the fluid glass during the initial sheet-forming period for the purpose of relaxing surface tension in the sheet of glass at its point of inception and for fire-polishing the sides of the sheet.

4. The method of continuously drawing a sheet of glass downwardly from a superimposed supply, which consists in continuously cooling a localized mass of glass within a body of more fluid glass to form a sheet source, and supporting this tenacious mass above an exit orifice, and forming the sheet of glass by drawing the tenacious glass from its source downwardly through the orifice and the more fluid glass.

5. The method of continuously drawing a sheet of glass downwardly from a superimposed supply, which consists in continuously cooling a localized mass of glass within a body of more fluid glass to form a sheet source, and supporting this tenacious mass above an exit orifice, and forming the sheet of glass by drawing the tenacious glass downwardly through the orifice, while causing a predetermined amount of the more fluid glass to be carried along and be deposited on the sheet to form the exterior thereof.

6. In an apparatus for drawing sheet glass, a receptacle for a pool of molten glass, the receptacle having a slot in the bottom from which the sheet of glass is drawn downward, and means within the pool of glass for directing a flow of cooler tenacious glass through the central portion of the slot to form the inner portion of the sheet, and for directing hotter more fluid glass through each edge of the slot to form the surfaces of the sheet.

7. In an apparatus for drawing sheet glass, a receptacle for a pool of molten glass, the receptacle having a slot in the bottom from which the sheet of glass is drawn downward, and means within the pool of glass for cooling that portion of the glass which is drawn into the inside of the glass sheet.

8. In an apparatus for drawing sheet glass, a receptacle for a pool of molten glass, the receptacle having a slot in the bottom from which the sheet of glass is drawn downward, means within the pool of glass for cooling that portion of the glass which is drawn into the inside of the glass sheet, and means for heating the glass which flows into the surfaces of the sheet.

9. In an apparatus for drawing sheet glass, a receptacle for a pool of molten glass, the receptacle having a slot in the bottom from which the sheet of glass is drawn downward, means within the pool of glass for making plastically rigid and for supporting that portion of the glass which is drawn into the inside of the glass sheet, means for controlling the amount of molten glass which shall pass from the pool to form the exterior portions of the sheet, and means for heating the surface glass.

10. In an apparatus for drawing sheet glass, a receptacle for molten glass, having a portion of the bottom open, a pair of closure members for the bottom aperture, adjustable toward and from one another to define a slot therebetween, means within the molten glass to cool the glass flowing through the central portion of the slot, means within each bottom member to heat the glass flowing over the edge thereof at the side of the slot, and means for drawing away a sheet of glass from the glass flowing through the slot.

11. In an apparatus for drawing sheet glass, a receptacle containing a pool of molten glass, there being a slot in the bottom of the receptacle, a pair of spaced partition members within the molten glass and projecting at their lower edges into the slot so as to define three parallel slots, means within the molten glass for cooling the flow of glass between the partitions, and means for heating the glass flowing through the outer pair of slots, and means for drawing away a sheet of glass from the combined output of the three slots.

12. In an apparatus for drawing sheet glass, a source of molten glass, a receptacle for a pool of molten glass and in open communication with the source, a pair of movable bottom members for the receptacle providing a slot of variable width therebetween, a pair of refractory partition members within the pool of molten glass, the members projecting into the slot at their lower ends so as to define three separate parallel slots in the bottom of the receptacle, one between the partitions and one between each partition and the adjacent bottom member, a cooler within the molten glass between the partition members, means for applying heat to the glass passing through the two outer slots, and means for drawing away a sheet of glass from below the slots.

13. In a sheet glass forming apparatus, a cooler comprising a hollow body portion, and a series of fluid conduits or pipes within the hollow body, the pipes terminating at different points within the cooler so that the cooling fluid may be applied selectively throughout the length of the cooler.

14. In an apparatus for drawing sheet glass from a receptacle containing molten glass, a pair of heating chambers arranged at either side of the sheet near its source, each chamber comprising a transverse series of independently adjustable vanes or plates for shutting off to any desired degree the opening between the heating chamber and the sheet.

15. The method of drawing sheet glass, consisting in drawing the sheet from three downwardly converging streams of molten glass, the central stream, from which the core of the sheet is formed, being cooler than the outer streams which form the sources of the sheet surfaces.

16. The method of forming sheet glass, consisting in flowing molten glass downwardly, around and through a sheet-source supporting member having a series of glass passages whereby an extensive anchoring area is presented to the flowing glass, and then drawing the glass away in sheet form from below the member.

17. In an apparatus for drawing sheet glass, a container for a supply of molten glass, and a perforated member around and through which molten glass flows from the supply, the glass being drawn from the member in sheet form.

18. In an apparatus for drawing sheet glass, a container for a supply of molten glass, and a member having a series of interior and exterior passages through which molten glass flows from the supply, the glass being drawn from the member in sheet form.

19. In an apparatus for drawing sheet glass, a receptacle for the molten glass, having an elongated orifice in its bottom, and a perforated member positioned in the orifice, around and through which the glass flows and is drawn away in sheet form.

20. In an apparatus for drawing sheet glass, a receptacle for the molten glass, having an elongated orifice in its bottom, the bottom walls of the receptacle inclining upwardly to the sides of the orifice to provide shallow overflow passages, and a perforated member positioned in the orifice, around and through which the glass flows and is drawn away in sheet form.

Signed at Toledo, in the county of Lucas, and State of Ohio, this 18th day of March, 1922.

ENOCH T. FERNGREN.